United States Patent
Gremaud et al.

(10) Patent No.: US 8,157,060 B2
(45) Date of Patent: Apr. 17, 2012

(54) ELEVATOR INSTALLATION WITH BRAKING EQUIPMENT AND METHOD OF BRAKING IN AN ELEVATOR INSTALLATION

(75) Inventors: Nicolas Gremaud, Wädenswil (CH); Hans Kocher, Udligenswil (CH); Josef A. Muff, Hildisrieden (CH)

(73) Assignee: Inventio AG, Hergiswil NW (CH)

( * ) Notice: Subject to any disclaimer, the term of this patent is extended or adjusted under 35 U.S.C. 154(b) by 1132 days.

(21) Appl. No.: 11/754,614

(22) Filed: May 29, 2007

(65) Prior Publication Data
US 2007/0272500 A1 Nov. 29, 2007

(30) Foreign Application Priority Data
May 29, 2006 (EP) .................................. 06114631

(51) Int. Cl.
*B61H 7/12* (2006.01)
(52) U.S. Cl. ................. 188/43; 188/71.7; 188/79.51
(58) Field of Classification Search ............... 188/43, 188/71.7, 71.8, 79.51; 187/355
See application file for complete search history.

(56) References Cited

U.S. PATENT DOCUMENTS

| 5,103,940 | A | 4/1992 | Meneut et al. | |
|---|---|---|---|---|
| 5,648,644 | A * | 7/1997 | Nagel | 187/288 |
| 2006/0180406 | A1 | 8/2006 | Gremaud et al. | |

FOREIGN PATENT DOCUMENTS

| DE | 16 75 157 B | 7/1971 |
|---|---|---|
| EP | 0648 703 A | 4/1995 |
| RU | 2222449 C2 | 1/2004 |
| SU | 1303471 A1 | 4/1987 |
| WO | 9402404 A1 | 2/1994 |

* cited by examiner

*Primary Examiner* — Robert Siconolfi
*Assistant Examiner* — Vu Q Nguyen
(74) *Attorney, Agent, or Firm* — Fraser Clemens; Martin & Miller LLC; William J. Clemens (57) ABSTRACT

An elevator installation has an elevator car that moves in a vertical direction along guide tracks and is braked or held at standstill by a braking equipment. The braking equipment includes at least two brake units, at least one of the brake units, but preferably each of the brake units, is provided with a wear-compensating device which, when the brake unit is opened or released, sets a clearance distance between a brake lining and an associated brake surface, which clearance arises on opening of the brake unit, in correspondence with a substantially constant value. Thereby, use may be made of customary and thus economic brake materials which may wear during braking.

25 Claims, 6 Drawing Sheets

Fig. 9

ELEVATOR INSTALLATION WITH BRAKING EQUIPMENT AND METHOD OF BRAKING IN AN ELEVATOR INSTALLATION

FIELD OF THE INVENTION

The invention relates to an elevator installation with an elevator car and to a method of braking an elevator car.

BACKGROUND OF THE INVENTION

In an elevator installation installed in a shaft, the shaft usually consists of solid building materials, but it can also be, at least partly, open. The elevator installation substantially consists of a car for transport of persons and/or goods. The car is connected with a counterweight by way of support means. The car is moved along a substantially vertical car travel path by means of a drive, which selectably acts on the support means or directly on the car or the counterweight, and is kept at a stop or is braked from a travel state to a stopped state by means of a brake.

Use is usually made of a brake, which is arranged at the drive, for holding and braking in the operational state and use is made of a safety brake device, which is arranged at the car, for holding and braking in the emergency case. The operational state comprises, for example, the normal operating sequences such as waiting at a floor or at a stop, receiving or unloading goods, travel of the car to another floor, stopping of the car or activities for performance of service operations on the elevator installation. By contrast, the emergency case comprises, for example, incorrect behavior during operation such as, for example, overloading of the car, failure of components, such as severing of a support means, or defects in control or mechanics.

In more recent solutions for holding and braking propose use is made of braking equipment which is frequently arranged at the car and which in the case of need comes into engagement and comprehends both states, i.e. both the operational state and the emergency situation.

Braking equipment of that kind is known from European patent document EP 0 648 703. Braking equipment mounted at the car is controlled in the drive appropriately to need and can fulfil demands resulting from the operational state and the emergency case. This braking equipment has the characteristic that in the case of wear of a brake plate a clearance changes. This has the effect that the time to bring the braking equipment into braking action changes, usually increases, since a greater advance path has to be covered, or wear-resistant brake plates have to be used. There are, for example, ceramic brake materials, which are specifically wear-resistant. Materials of that kind are, however, very expensive. Wear results from abrasion of brake material during braking.

Braking equipment which can compensate for wear of brake plates is described in U.S. Patent Application Publication No. 2006/180406. The wear compensation illustrated there can set a total sum of clearances or it can set a braking force independently of the wear of brake plates. This braking equipment also obliges the total sum of clearances to be selected to be large in such a manner that the wear of individual brake plates does not have a negative effect. This equally has the effect that the time to bring the braking equipment into braking action is correspondingly increased or that appropriately wear-resistant brake plates have to be used.

SUMMARY OF THE INVENTION

Objects of the present invention include providing an elevator installation with an elevator car and a method for braking and holding an elevator car which enable operation over a longer operating period. There should be tolerance with respect to inaccuracies in the car travel path and a rapid response should be possible in the case of need. Moreover, the braking equipment shall nevertheless be economic, i.e. able to be operated, inter alia, with economic non-wear-resistant brake plates.

The present invention fulfils at least one of these objects. The elevator installation comprises an elevator car which moves in vertical direction along guide tracks. In the case of need the elevator car is braked or held at standstill by braking equipment. The braking equipment consists of at least two brake units. Each of the brake units comprises at least one brake lining, which in the case of need co-operates with a brake track. According to the present invention at least one of the brake units, but preferably each of the brake units, is provided with a wear-compensating device which when the braking equipment is relieved sets a clearance, which arises between the brake lining and the brake track, in correspondence with a substantially constant value. The clearance is a free distance, which results when a brake is opened, between the brake lining and associated brake surface.

It is thereby achieved that use can be made of customary and thus economic brake materials which wear during use. A worn brake material would necessarily lead to a larger clearance. A larger clearance would cause a greater need for time in order to bring the brake unit into braking setting. The wear-compensating device according to the present invention now produces the advantage that: operation of the braking equipment is made possible over a long operating period, since a wear-compensating device compensates for arising wear: the braking equipment is tolerant with respect to inaccuracies in a brake track, since a clearance can be predetermined in correspondence with the anticipated inaccuracies: and the braking equipment can respond rapidly in the case of need, since a greater advance travel is not required as a consequence of wear. The brake track can be a separate track provided for the purpose of braking or it can be identical with the guide track. Inaccuracies in this brake track or guide track result on the one hand from joining together individual track elements to form a track as well as deviations of the track over its entire length as a consequence of building settling, thermal expansion differences, etc.

In an advantageous embodiment the brake unit comprises a brake housing, a brake plate movable with respect to the brake housing and a brake plate fixed with respect to the brake housing, wherein the brake plates in the case of need are brought by means of an advance device into contact with a brake track. The advance device comprises advance checking means which recognizes and checks a total advance travel. The wear-compensating device in that connection keeps a clearance on the side of the fixed brake plate substantially constant and the advance device keeps a total clearance constant. In the case of actuation of the brake unit, advance of the movable brake plate by means of the advance device until the movable plate contacts the brake track thus takes place in a first step. Through further actuation of the advance device the brake housing together with the fixed brake plate is then urged towards an opposite side of the brake track until the fixed brake plate contacts the opposite side of the brake track. Tightening of the brake plates relative to the brake track, whereby braking takes place, is now carried out by a further advance movement. Compensation for abrasion or wear of the movable brake plate is provided directly by further advance of the movable brake by the advance device. Wear of the fixed brake plate takes place indirectly in that the advance device further advances the brake housing together with the fixed brake plate and this advance of the brake housing is determined by the wear-compensating device. The thus-achieved advanced position of the brake housing together with the fixed brake plate forms the final working position of the fixed brake lining. This final working position forms the basis for resetting the brake housing together with the fixed brake plate. The reverse sequence analogously results when the brake unit is opened. The advance device relieves the brake plates, thereafter the brake housing together with the fixed brake plate is reset, beginning from the final working position, in correspondence with the set clearance of the fixed brake plate and as soon as the fixed brake plate has attained its clearance the movable brake plate is drawn back by the residual amount of the total clearance. This embodiment enables provision of an economic brake unit, since advance regulating means alone checks the total clearance and the wear-compensating device sets the clearance of the fixed brake side, which can be realized by simple means.

Advantageously the total clearance corresponds with twice the amount of the clearance of the side of the fixed brake plate. This allows even division of the clearance to the side of the fixed brake plate and the movable brake plate. In the individual case it can be advantageous to distribute the clearance asymmetrically, for example in the ratio of 1 to 3. This is of advantage in the case of use of a guide system loaded at one side, for example a "car with rucksack guidance", since a smaller clearance can be feasible on a less loaded side by comparison with a highly loaded side.

The brake unit is guided along the brake track. The form of guidance defines, inter alia, requisite plays in transit and thus the requisite clearance. In an advantageous embodiment the brake unit comprises a guide support which is directly guided along the brake track by means of a guide shoe substantially free of play. The wear-compensating device, preferably a mechanical wear-compensating device, is in that case arranged at a connecting point between the guide support and the brake housing. This arrangement is advantageous, since the brake unit is thereby guided very precisely along the brake track and thus the clearances, which are required for compensation for guidance inaccuracies, can be kept small. In this embodiment it is essentially only necessary to take into account track deviations which result through joining together individual track elements. In this connection, clearances respectively of 0.15 to 0.35 millimeters typically result.

In a first embodiment the elevator car is in that case guided along its travel path by means of own car guide shoes and a connecting point of the elevator car with the guide support transmits braking and/or holding forces in vertical direction and makes possible lateral compensation for guidance inaccuracies. This permits a comfort-specific guidance of the elevator car, but is more cost-intensive, since individual guide elements are required for the elevator car and the brake unit. In a embodiment the elevator car is guided by means of the guide support of the braking equipment or by guide shoes integrated in this guide support and a connecting point of the elevator car with the guide support transmits lateral guidance forces and braking and/or holding forces in vertical directions. Costs are reduced, since the functionality of the car guidance is integrated in the guidance of the brake unit.

In another embodiment the guide support is executed as part of the elevator car. The wear-compensating device is correspondingly arranged at a connecting point between the guide support or the elevator car and the brake housing. In this connection a clearance has to be formed to be of such a size that the anticipated guidance deviations can be absorbed. This alternative usually demands, by comparison with the aforesaid embodiments, a larger clearance, which obliges a correspondingly longer advance travel or advance time. These influences have to be taken into consideration in the design of the braking system. In this embodiment it is essentially necessary to take into account not only the track deviations resulting due to joining together individual track elements, but also track deviations resulting due to, for example, assembly inaccuracies, building settlement and also thermal expansions. In order that deviations of those kinds do not influence travel comfort, clearances each of 0.75 to 1.5 millimeters or more typically result with this embodiment. It is clear that the response delays, which arise due to these larger clearances, in the case of use of the brakes have to be taken into consideration in the design of the brakes.

The mechanical wear-compensating device comprises at least one positioning part, a restoring memory, for example in the form of a spring, and a slip connection, for example in the form of a friction connection. The positioning part is arranged to be sliding by way of a slide connection within the desired clearance between guide support and brake housing and it is further displaceable, in slipping manner, in the amount of wear anticipated in the extreme case. The positioning part is then, if no further forces act, held by the restoring memory in a rest position or standby position. This position at the same time corresponds with the unactuated or opened brake unit. The adjusting force required for displacing the slip connection is greater than the restoring force procured by the restoring memory.

On actuation of the fixed brake plate the positioning part is displaced in correspondence with its freely displaceable slide path, which substantially corresponds with the clearance, in the slide connection against the restoring memory. On further advance movement, which is required due to, for example, wear, the positioning part is displaced in the slip connection. On opening of the fixed brake plate the restoring memory now displaces the positioning part back in correspondence with the slide path freely displaceable in the slide connection, whereby the associated clearance is set.

This simple mechanical wear-compensating device is economic to produce, simple in function and correspondingly functionally reliable.

The wear-compensating device optionally makes possible setting of the desired clearance by means of, for example, a clearance setting screw or nut. This is advantageous, since the brake unit can be adjusted to requirements in situ.

Advantageously the guide support comprises a holder which accepts vertical braking forces directly at the brake lining or the fastening plate thereof, introduces the vertical braking forces into the guide support and into the car and substantially relieves the brake housing of vertical forces. This is advantageous, since accordingly the brake housing together with the movable elements such as advance device and wear-compensating device merely has to be dimensioned in correspondence with advance forces. This allows simpler and more economic production.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 4.1 through 4.4a show functional sequences, by way of example, for the compensation of wear wherein FIG. 4.1 shows the brake unit of FIG. 2 in the new-state rest position (without wear), FIG. 4.1a shows a detail of the wear-compensating device of FIG. 4.1, FIG. 4.2 shows the brake unit in the new-state braking position (without wear), FIG. 4.2a shows a detail of the wear-compensating device of FIG. 4.2, FIG. 4.3 shows the brake unit in a used state (with wear), FIG. 4.3a shows a detail of the wear-compensating device of FIG. 4.3, FIG. 4.4 shows the brake unit in a used state (with wear), and FIG. 4.4a shows a detail of the wear-compensating device of FIG. 4.4;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
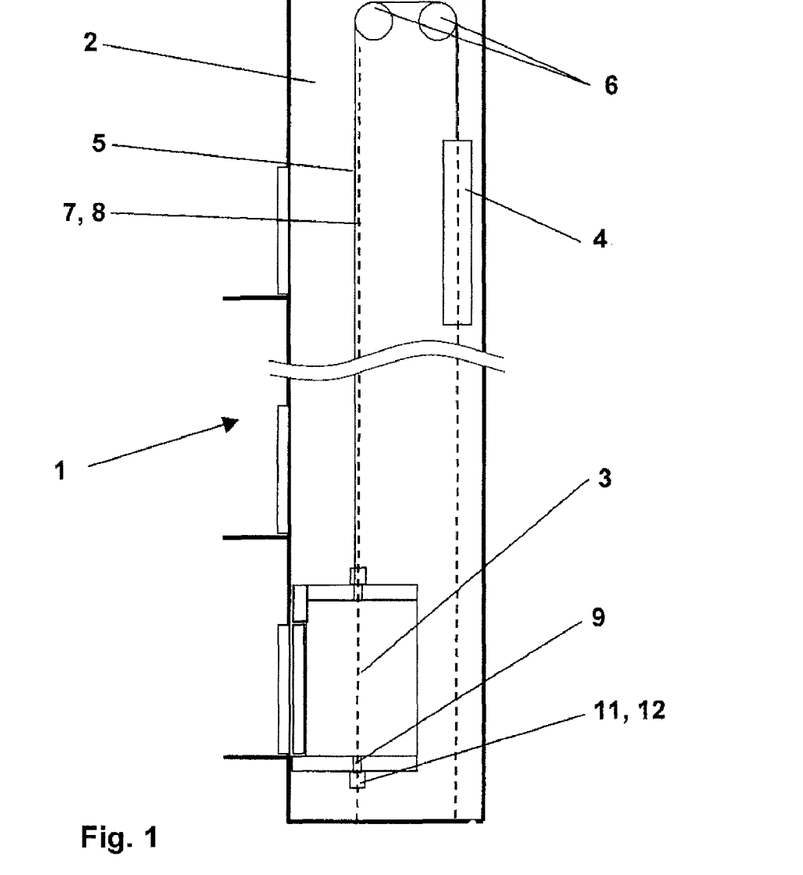
FIG. 1 is a schematic side elevation view of a part of an elevator installation according to the present invention.
Figure 1A:
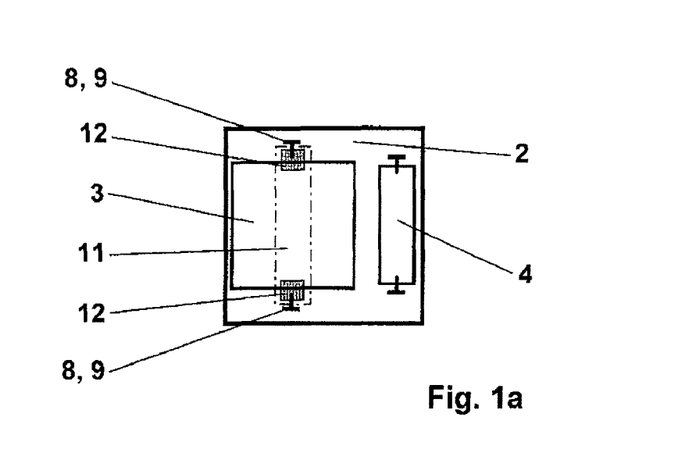
FIG. 1a is a schematic plan view of the elevator installation shown in FIG.

One possible overall arrangement of an elevator installation is illustrated in FIG. 1 and FIG. 1a. FIG. 1 shows the elevator installation 1 in a schematic side view and FIG. 1a shows the same elevator installation 1 in a schematic plan view. The illustrated elevator installation 1 comprises an elevator car 3 which moves in a vertical direction in a shaft 2 along guide tracks 7. The elevator car 3 is supported by support means 5 and is connected with a counterweight 4. The counterweight 4 and the elevator car 2 are driven by a drive 6 by way of the support means 5 and move in opposite sense in the elevator shaft 2. The elevator car 3 is provided with braking equipment 11 which brakes the elevator car or keeps it at standstill. The braking equipment 11 comprises at least two brake units 12 which each act on a respective one of the guide tracks 7. The brake units 12 co-operate as a single braking equipment 11, wherein the braking equipment 11 can optionally define the braking force requirement for a single individual brake unit 12. The brake units 12 are, in the illustrated example, attached below the car body 3. However, attachment laterally and/or above the elevator car 3 is also possible. Obviously, combinations of these attachment locations are also conceivable. This would be useful above all if, for extending the braking performance, several brake units 12 are used. The elevator car is provided with guide shoes which guide the car 2 along the guide track 7. In the illustrated example the guide track 7 is formed by a T-shaped guide rail, which at the same time is also a brake track 8. Other forms of elevator installations are obviously possible. An automotive elevator car, for example with a linear motor, can be used and the elevator shaft can be partly open, or separate tracks for guiding (guide track 9) and braking (brake track 8) can be used.

Figure 2:
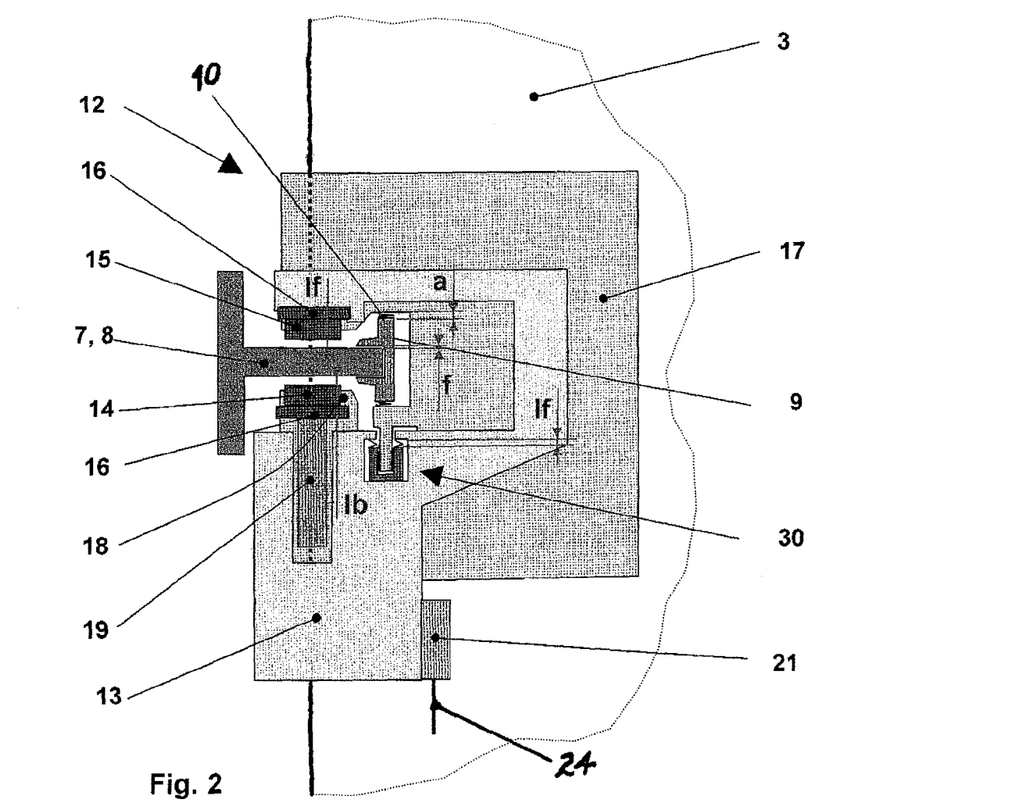
FIG. 2 is a schematic sectional view of the brake unit with a wear-compensating device and guide support, which is integrated in the elevator car shown in FIG. 1.

FIG. 2 shows the elevator brake unit 12 as used in correspondence with the present invention in the elevator installation 1 according to FIG. 1. The brake unit 12 is attached to the car 3. The brake unit 12 comprises a brake housing 13, a brake plate 14 movable with respect to the brake housing 13 and a brake plate 15 fixed with respect to the brake housing 13. The brake plates 14 and 15 are, in the case of need, brought by means of an advance device 19 into contact with the brake track 8. The brake plates 14 and 15 are connected by means of fastening plates 16 with the brake housing 13 and the advance device 19, respectively. The brake track 8 in the illustrated example is at the same time the guide track 7, wherein a conventional T-shaped guide rail is used. The brake unit 12 further comprises a guide support 17. The guide support 17 serves for fastening or connecting the brake housing 13 with the car 3. It is fixedly connected with the car 3. A wear-compensating device 30 is, in the illustrated example, arranged between the guide supports 17 and the brake housing 13. The guide support 17 at the same time comprises the guide shoe 9 which guides the elevator car 3 along the guide track 7. The guide shoe 9 is resiliently mounted with respect to the car 3. This enables insulation from guidance vibrations. A resilient intermediate element 10 allows the car 3 oscillatory deviations (distance "a") relative to the guide track 7. A clearance "If", "Ib" of the brake unit is in this case set to be of such a size that even in the case of outward oscillation of the car within the scope of the guidance resilience "a" and possible guidance plays "f" as well as offsets in the meeting of guide track parts no contact of the brake plates 14, 15 with the guide track 7 or brake track 8 takes place.

The wear-compensating device 30 now keeps the fixed clearance "If", during release of the brake 12, substantially constant on the side of the fixed brake plate 15. The illustrated brake unit 12 further consists of electromechanical components. It comprises advance regulating means 21 which keeps a predetermined total clearance "It" constant by actuating the advance device 19. The total clearance "It" is formed by the sum of the fixed clearance "If" and the movable clearance "Ib", wherein the fixed clearance "If" corresponds with the side of the fixed brake plate 15 and the movable clearance "Ib" corresponds with the side of the movable brake plate 14. The terms "fixed" and "movable" are used in this connection merely for definition. The advance regulating means 21 moves the movable brake plate 14 directly perpendicularly to the brake or guide surface 7, 8. As a rule, several wear-compensating devices 30 are arranged in parallel, preferably one above the other.

The brake unit 12 is an electromechanical brake unit in which the movable brake lining 14 is advanced by means of an electromechanical drive, such as, for example, a spindle drive. In the case of need the advance spindle is actuated by way of a gear stage. The brake unit 12 preferably comprises advance checking means in the advance regulating means 21. By means of this advance checking means a brake plate wear and/or deviations from a normal behavior of the brake unit 12 can be ascertained and a signal generated on an advance checking signal line 24 so that the overall wear can be checked by this method.

As a rule the wear-compensating device 30 is set in such a manner that the clearance "If" of the side of the fixed brake plate 15 is equal to the clearance "Ib" of the movable brake plate 14. It thus corresponds with half the total clearance "It". This setting is advantageous when centrally suspended or centrally guided elevator cars 3 are concerned. However, the wear-compensating device 30 also enables asymmetric settings, whereby an uneven division of the clearances (If, Ib) can be achieved. This is useful particularly in the case of asymmetrically suspended elevator cars, where a possible wear of the guide shoes 9 makes itself noticeable on one side.

The guide support 17 further comprises a holder 18. The holder 18 supports the brake plates 14, 15 or the fastening plates 16 and conducts braking forces directly into the guide support 17 and further into the car 3. The brake housing 13 itself is thereby relieved of the actual braking force; merely the normal force acting in one direction and generating the braking force by way of friction has to be accepted.

Figure 3:
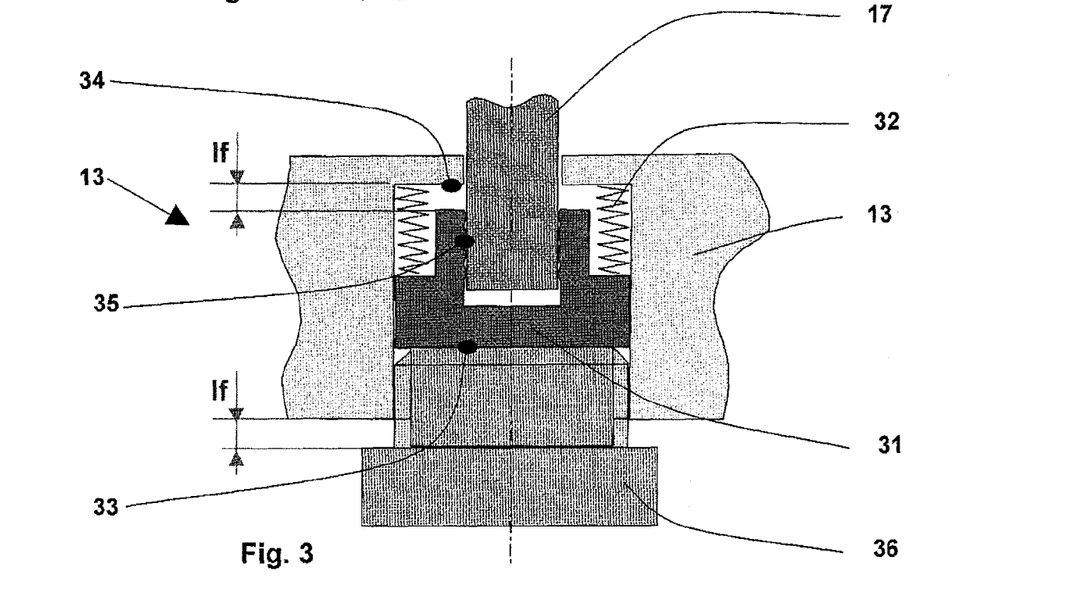
FIG. 3 is a schematic detail view of an adjustable wear-compensating device according to the present invention.

FIG. 3 illustrates the settable wear-compensating device 30 in detail. The wear-compensating device 30 consists of a positioning part 31, a restoring unit 32, a first abutment 33 and a second abutment 34. The wear-compensating device 30 produces a connection of the brake housing 13 with the guide support 17. In this embodiment the positioning part 31 is connected by a slip connection 35 with the guide support 17. The positioning part 31 is preferably produced from a plastic material. It can be displaced relative to the guide support 17 only by a substantial force of, for example, approximately 25 N to 50 N. The positioning part 31 itself is slidably arranged in the brake housing 13 to be easy-running. The brake housing 13 can thereby displace relative to the guide support 17 in two stages. The direction of displacement is in that case oriented in the direction of the normal force. In a first displacement stage the brake housing 13 can be displaced by a small force slidingly relative to the positioning part 31 and thus also slidingly relative to the guide support 17. This sliding displacement is limited by the first abutment 33 and the second abutment 34. This first displacement stage corresponds with the desired clearance "If" of the fixed brake plate side. In the example, this first displacement stage or the clearance "If" is settable by means of a clearance play setting screw 36. The restoring unit 32, which is arranged between the brake housing 13 and the positioning part 31, in the form of a spring in this connection displaces the brake housing 13 up to the boundary mark of the first abutment 33. In a second displacement stage the brake housing 13 together with the positioning part 31 can be displaced in slipping manner relative to the guide support 17. The FIG. 4 series—comprising FIGS. 4.1 to 4.4a-now explain by way of example the functional sequence for compensation of wear. FIGS. 4.1, 4.2, 4.3 and 4.4 each show a working setting, by way of example, of the brake unit and the details according to FIGS. 4.1a, 4.2a, 4.3a and 4.4a show the respectively associated setting of the wear compensation device.

Figure 4:
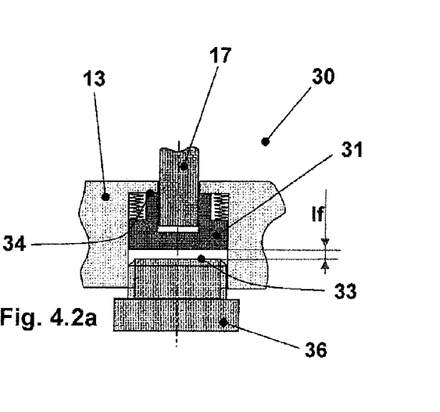
Figures 4, 41:
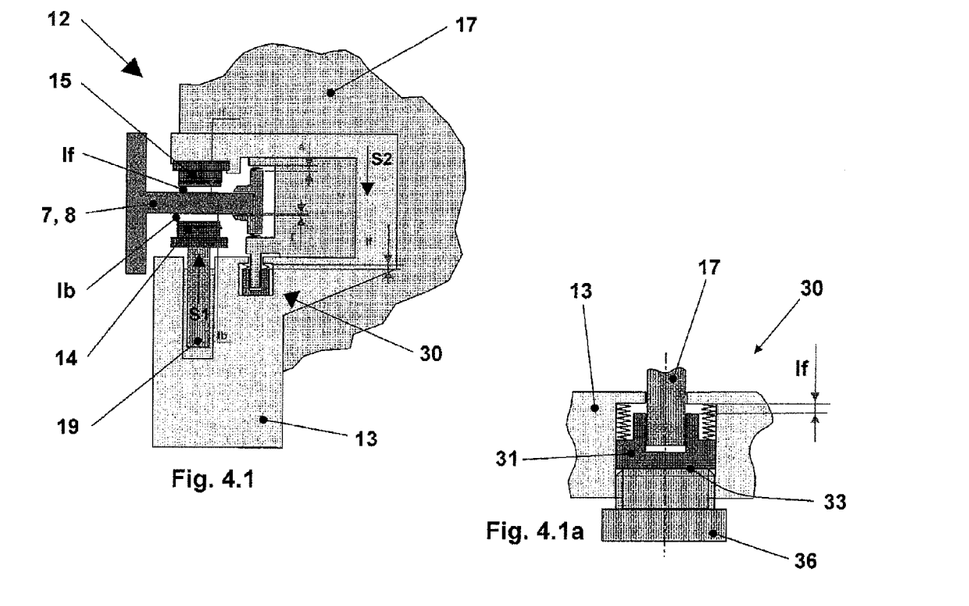

FIG. 4.1 and FIG. 4.1a show the brake unit 12 in the working setting, i.e. the brake is open. The brake linings 14, 15 are spaced on both sides of the brake track 8 by the clearance (If, Ib). The positioning part 31 of the wear compensating unit 30 is pressed against the first abutment 33 defined by the clearance play setting screw 36. The possible free displacement path or slide path of the positioning part 31 is set in correspondence with the desired fixed clearance "If". In the case of actuation of the brake unit 12 there thus takes place in a first step (S1) advance of the movable brake plate 14 by means of the advance device 19 until the movable plate 14 contacts the brake track 8, and then, by further actuation of the advance device 19, the brake housing 13 together with the fixed brake plate 15 is urged towards the opposite side of the brake track 8 (S2) until the fixed brake plate 15 contacts the opposite side of the brake track 8. Tightening of the brake plates 14, 15 relative to the brake track 8 now takes place by a further advance movement, whereby braking is carried out.

This work setting is illustrated in FIGS. 4.2 and 4.2a. It is illustrated in the following how now compensation is provided for the clearance in the wear compensating unit 30. The positioning part 31 stands against the second abutment 34. Compensation for abrasion or wear of the movable brake plate 14 is now, as illustrated in FIGS. 4.3 and 4.3a, provided directly by a further advance of the movable brake plate 14 by the advance device 19. Compensation of wear "v" of the fixed brake plate 15 is carried out indirectly in that the advance device 19 further advances the brake housing 13 together with the fixed brake plate 15 (S3) or pulls this tight and this advance of the brake housing 13 produces in the wear-compensating device 30 a slipping in the slip connection 35 between the brake housing 13 and the guide support 17, since the slide path of the positioning part 31 is already applied. The advanced position of the brake housing 13 together with the fixed brake plate 15 thus now achieved forms the final working position of the fixed brake lining 15 in this braking sequence. This final working position now necessarily forms the basis for resetting of the brake housing 13 together with the fixed brake plate 15.

Figure 44:
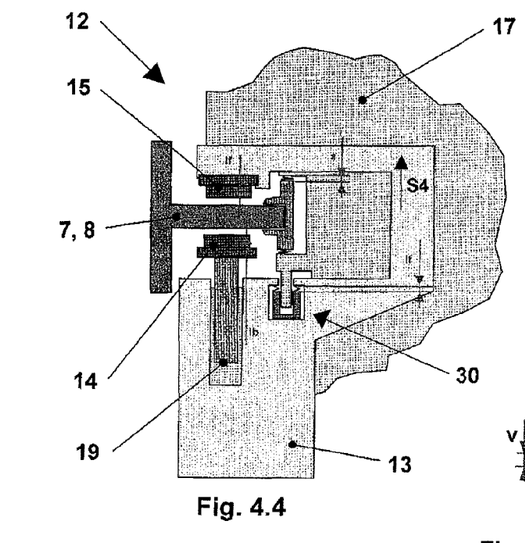

On opening of the brake unit 12 the reverse sequence takes place analogously, which leads to the state according to FIGS. 4.4 and 4.4a. The advance device 19 relieves the brake plates 14, 15, and thereafter the brake housing 13 together with the fixed brake plate 15, beginning from the final working position, is reset in correspondence with the set clearance "If" of the fixed brake plate 15 (S4). This resetting is produced by the restoring unit 32 which, acting against the positioning part 31, displaces the brake housing 13 in acting in correspondence with the set clearance path "If" back to the first abutment 33. As is apparent in FIG. 4.4a, the positioning part 31 now slips relative to the guide support 17 by the wear amount "v". The fixed brake plate 15 has reached its clearance "If" and the movable brake plate 14 can now be drawn back by the residual amount of the total clearance (Ib=It−If). The brake unit is ready for the next braking action and the advance travels correspond with the new state. Thus, actuating times, which were applicable to the new brake, can also be maintained for a worn brake.

Figure 5:
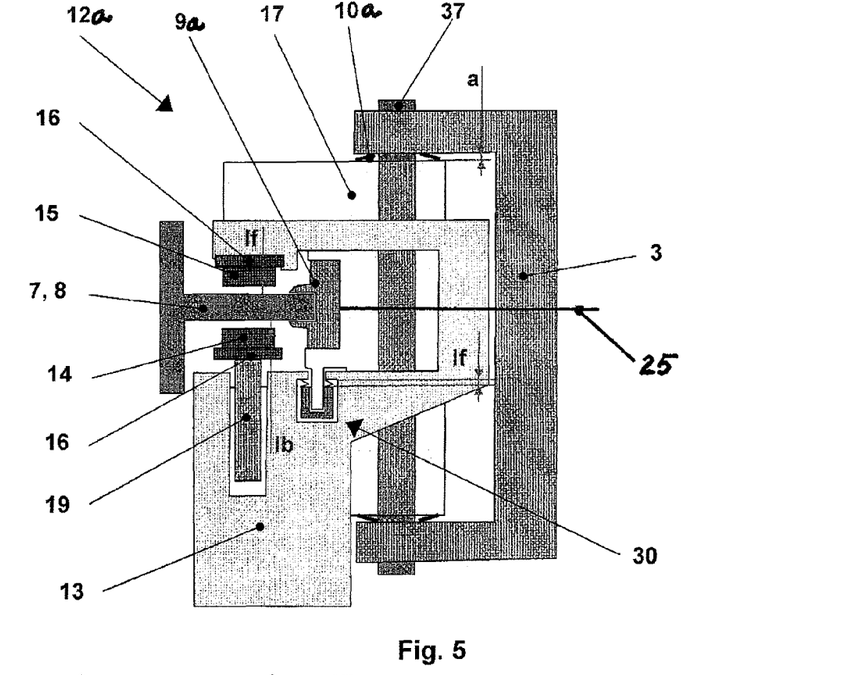
FIG. 5 is a schematic sectional view of a brake unit with wear-compensating device and an elevator car guide, which is integrated in brake unit, according to a second embodiment of the present invention.

FIG. 5 shows a schematic view of a second embodiment brake unit 12a with a wear-compensating device and an elevator car guide integrated in the brake unit. The guide support 17 is guided along the brake and guide track 7, 8 directly by the guide shoe 9, whilst the car 3 is fastened relative to the guide support 17 by way of a resilient element 10a, for example a rubber spring, a damper or an active vibration damping means. The function of the braking equipment 12a itself corresponds with the foregoing illustrations. The advantage of this solution results from the fact that the clearance "If" can be executed to be smaller, since an oscillatory path of the car does not have to be taken into consideration. Obviously the coupling of the guide support 17 is designed in such a manner that vertical braking and retaining forces can be transmitted.

Figure 6:
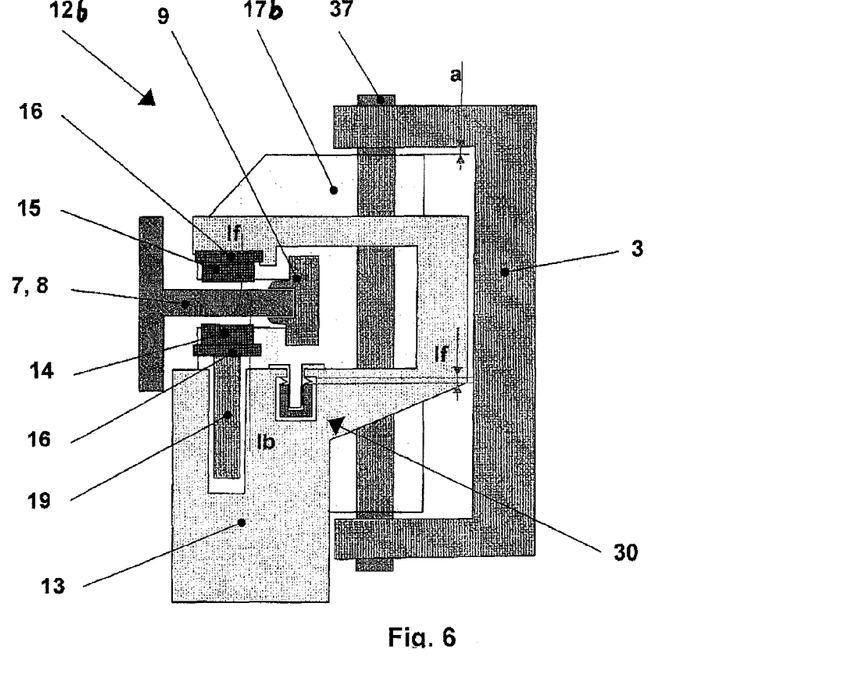
FIG. 6 is a schematic sectional view of a brake unit with wear-compensating device and separate guide for brake unit and elevator car according to the present invention.

FIG. 6 shows a schematic view of a third embodiment brake unit 12b with a wear-compensating device and a separate guidance for the brake unit and the elevator car. The guide support 17b is guided along the brake and guide track 7, 8 directly by the guide shoe 9 and the car 3 is guided by own guide elements (not illustrated). The function of the brake equipment 12b itself corresponds with the preceding illustrations. The advantage of this solution results from the fact that the clearance "lf" can similarly be formed to be small, since an oscillatory path of the car 3 does not have to be taken into consideration and a design of the guide shoe 9 of the brake can be undertaken independently of the car 3.

Figure 7:
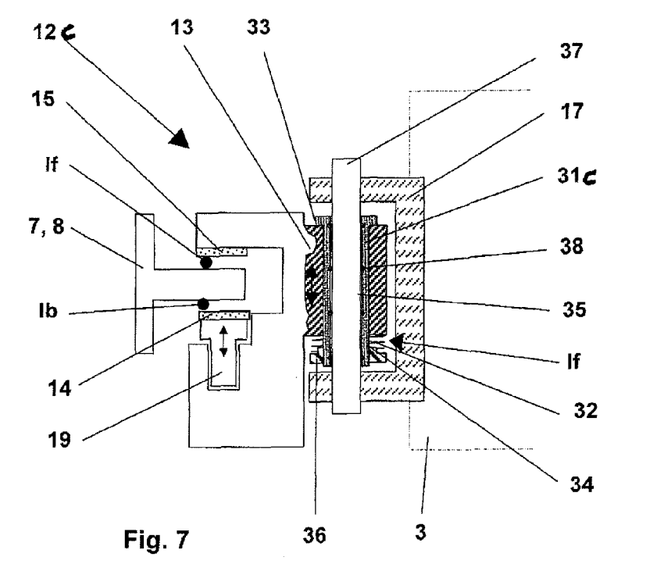
FIG. 7 is a schematic sectional view of an alternate embodiment of a brake unit with wear-compensating device according to the present invention.

FIG. 7 shows a fourth of embodiment of a brake unit 12*c* with wear-compensating device. The guide support 17 is fastened relative to the car 3. The brake housing 13 is connected with the guide support 17 by way of the positioning part 31*c* and a support pin 37. The support pin 37 is analogously a part of the guide support 17. The brake housing 13 is slidingly displaceable on the sleeve-shaped positioning part 31*c*, wherein the displaceability on the positioning part 31*c* is limited by a slide limitation, which can be set by means of clearance play setting screw or clearance play setting nut 36 in correspondence with the desired clearance "lf". The restoring unit 32 urges the brake housing 13, when the advance device 19 is relieved, into the release position with respect to the first abutment 33. When the wear "v" occurs, the positioning part 31*c* can slip on the support pin 37, which leads to a wear compensation, as analogously explained in the FIG. 4 series. Two support pin arrangements of that kind are preferably arranged one above the other, whereby braking forces are also directly transmissible. The slip connection 35 in this example of embodiment is solved in particularly economic manner. O-rings 38 are inserted in the positioning part 31*c* and the positioning part 31*c* is pushed by light pressure onto the support pin 37, which is advantageously produced from metal or steel. This slip connection 38 is preferably lubricated. The definition of the required slip force takes place in co-ordination with the definition of the restoring unit. The force required for slipping lies by more than approximately 40% above the force able to be applied by the restoring unit. Instead of the illustrated slip connection 35 on a friction basis, use could also be made of detent connections. Detent connections re-adjust in steps.

Figure 8:
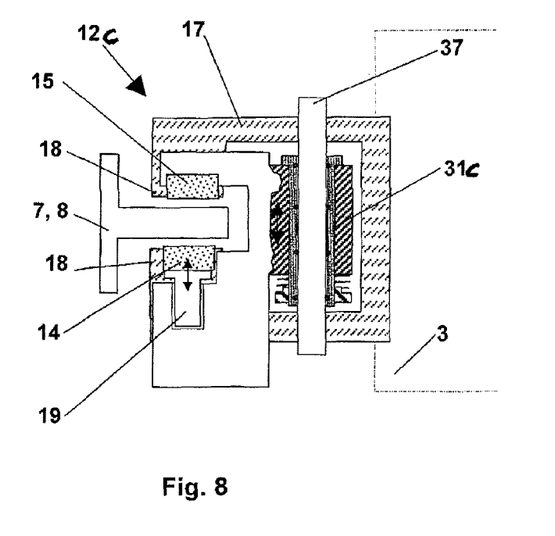
FIG. 8 is a view if brake unit according to FIG. 7 with an integrated holder.

FIG. 8 shows the brake unit according to FIG. 7 with an integrated holder. The guide support 17 already illustrated in FIG. 7 is provided with the holder 18, which directly supports the brake plates 14, 15 during braking and thus introduces braking and holding forces into the guide support 17. The brake housing 13 together with the wear-compensating device 30 and the entire advance device 19 is thereby loaded merely by normal forces.

Figure 9:
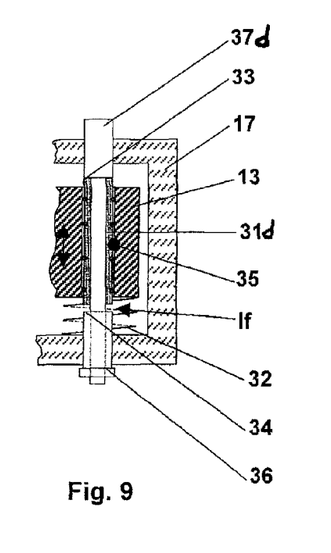
FIG. 9 is a schematic sectional view of another embodiment of a brake unit with wear-compensating device and support pin according to the present invention.
Figure 42:
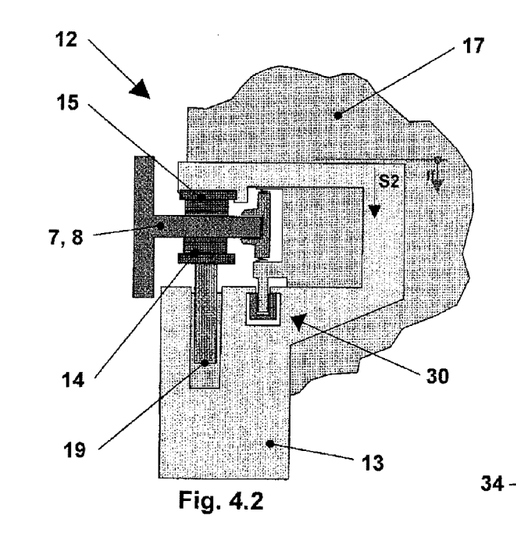
Figure 43:
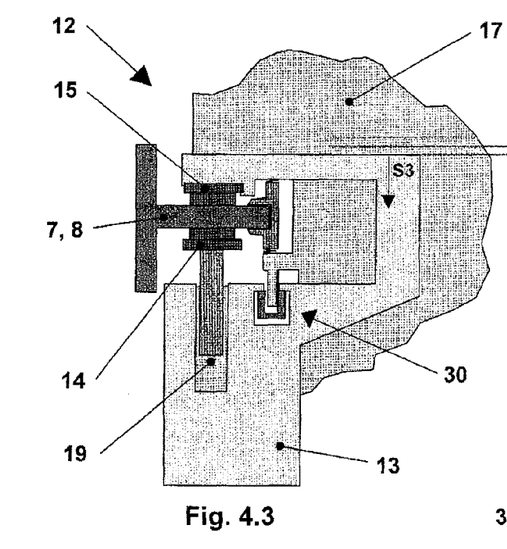

FIG. 9 shows another embodiment of a brake unit with a wear-compensating device and a support pin according to the present invention. The brake housing 13 is, similarly to that shown in FIG. 7, connected with the guide support 17 by way of the positioning part 31 and a support pin 37*d*. The support pin 37*d* is analogously a part of the guide support 17. The brake housing 13 is arranged on the sleeve-shaped positioning part 31*d* to be slidingly displaceable. The displaceability on the positioning part 31*d* is limited by a slide limitation, which can be set by means of clearance play setting screw or clearance play setting nut 36 in correspondence with the desired clearance "lf". The functionality of the slide limitation in this example is integrated in the support pin 37*d* and the functionality of the slipping is integrated between brake housing 13 and the positioning part 31*d*. The restoring unit 32 urges the brake housing 13, when the advance device 19 is relieved, towards the first abutment 33 into the clearance position. When the wear "v" occurs, the brake housing 13 can slip on the positioning part 31*d*, which leads to a wear compensation as explained analogously in the FIG. 4 series. Here, too, two support pin arrangements of that kind are preferably arranged one above the other, whereby the braking forces were transmitted directly to the guide support.

With knowledge of the present invention and the illustrated variants of embodiment the elevator expert can change and combine the set forms and arrangements as desired. For example, the illustrated use of O-rings, the solution of the support pin and also the arrangement of guide elements or the use of a holder can be combined with the illustrated arrangements of wear-compensating devices. Similarly, the guide shoe can be formed with use of known technologies. In particular, use can be made of a sliding guide shoe or a roller guide shoe 9*a* in FIG. 5. The guide shoe 9*a* can comprise a measuring system on the basis of which a travel speed of the braking equipment or of the car can be ascertained to generate a signal on a line 25. This information can be used, for example, by a regulating unit of the braking equipment. In addition, a regulated clearance play setting with use of a servomotor is possible. In that case, for example, a clearance play "lf" of the fixed brake plate side would be changed in dependence on the operational state of the elevator installation in that the clearance play setting screw 36 would be screwed in or out by means of the servomotor.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation having an elevator car, which moves in a vertical direction along guide tracks and which in the case of need is braked or held at standstill by braking equipment, the braking equipment including at least two brake units, each of the brake units having brake plates which co-operate with a brake track when the brake units are actuated, the braking equipment comprising:

one of the at least two brake units including a wear-compensating device which on release of said one brake unit after actuation sets a clearance between the brake plates of said one brake unit and the brake track in correspondence with a substantially constant value, wherein said wear-compensating device sets a desired fixed clearance between a fixed one of said brake plates and the brake track; and wherein said one brake unit includes a brake housing and a guide support connected to said brake housing by said wear-compensating device, and said wear-compensating device includes a positioning part that is connected by a slip connection or a detent connection with one of said brake housing and said guide support and which is mutually connected by way of a slide connection with another of said guide support and said brake housing, wherein said slide connection enables relative sliding between said brake housing and said guide support in correspondence with a desired clearance between one of said brake plates and the brake track and a relative slipping in said slip connection takes place when said desired clearance is exceeded.

2. The elevator installation according to claim 1 wherein said one brake unit further includes a movable brake plate movable with respect to said brake housing and a fixed brake plate fixed with respect to said brake housing, said movable and fixed brake plates being brought into contact with the brake track by an advance device during actuation, and when said one brake unit is open said wear-compensating device keeps a clearance from the brake track on a side of said fixed brake plate substantially constant and said advance device keeps a total clearance between said fixed and movable brake plates and the brake track constant.

3. The elevator installation according to claim 2 wherein said total clearance corresponds with twice an amount of the clearance between said fixed brake plate and the brake track.

4. The elevator installation according to claim 1 wherein the elevator installation includes a guide rail which has the guide track and the brake track formed thereon.

5. The elevator installation according to claim 1 wherein said wear-compensating device is arranged at a connecting point between said guide support and said brake housing, wherein said guide support is guided along the brake track substantially free of play by a guide shoe and said guide support is one of fixedly, resiliently and slidably connected with the elevator car.

6. The elevator installation according to claim 5 wherein said guide shoe is at least one of a sliding guide shoe, a guide roller and a measuring system by which a signal representing a travel speed of the brake equipment or the car is generated.

7. The elevator installation according to claim 1 wherein said guide support includes a holder which accepts vertical braking forces generated in said brake plates and introduces the vertical braking forces into said guide support and into the car and substantially relieves said brake housing of the vertical forces.

8. The elevator installation according to claim 1 wherein said one brake unit further includes a movable brake plate movable with respect to said brake housing, and said positioning part being connected to said brake housing by a slide connection and connected to said guide support by a slip connection, said brake housing being urged by a restoring unit in a direction of said fixed brake plate, wherein said restoring unit is arranged between said brake housing and said positioning part, between said positioning part and said guide support, or between said brake housing and said guide support and wherein a restoring force produced by said restoring unit is less than a slip resistance force produced in said slip connection, but said restoring force produced by said restoring unit is greater than a slide resistance force produced in said slide connection.

9. The elevator installation according to claim 1 wherein each of said brake plates is connected with one of said brake housing and an advance device by a fastening plate, said fastening plates forming together with a holder a support point which introduces vertical braking forces from said brake plates into said holder, said brake housing being relieved of the vertical braking forces and enabling horizontal advance of said brake plates toward the brake track.

10. The elevator installation according to claim 1 wherein said one brake unit includes an advance regulating means for setting a predetermined total clearance between the brake plates and the brake track, and including an advance checking means detecting brake plate wear and departures from normal behavior of said one brake unit.

11. The elevator installation according to claim 1 wherein said one brake unit includes a movable brake plate movable by an advance device regulated by an advance regulating means, said advance device moving said movable brake plate perpendicular to a facing surface of the brake track.

12. The elevator installation according to claim 11 wherein said advance device includes an electromechanical spindle drive having a spindle which in case of need can be actuated by a gear stage.

13. The elevator installation according to claim 1 wherein the braking equipment is arranged at the elevator car, the brake units are attached to the elevator car, and the brake units in case of need act on the guide tracks.

14. A method of braking and holding an elevator car, the elevator car being a component of an elevator installation and being moved along guide tracks, the elevator car in the case of need being braked or held at standstill by braking equipment and the braking equipment having at least two brake units, each of the brake units having brake plates which co-operate with a brake track when the brake units are actuated, comprising the steps of:
    actuating one of the at least two brake units;
    opening the one brake unit; and
    upon opening of the one brake unit adjusting a clearance from an adjacent one of the guide tracks with a wear-compensating device in correspondence with a substantially constant value, wherein said wear-compensating device maintains a desired fixed clearance between a fixed one of said brake plates and the brake track, providing the one brake unit with a brake housing and a guide support connected to the brake housing by said wear-compensating device, and providing said wear-compensating device with a positioning part that is connected by a slip connection or a detent connection with one of said brake housing and said guide support and which is mutually connected by way of a slide connection with another of said guide support and said brake housing, wherein said slide connection enables relative sliding between said brake housing and said guide support in correspondence with the desired fixed clearance between the fixed one of said brake plates and the brake track and a relative slipping in said slip connection takes place when said desired fixed clearance is exceeded.

15. An elevator installation having an elevator car, which moves in a vertical direction along guide tracks and which in the case of need is braked or held at standstill by braking equipment, the braking equipment including at least two brake units, each of the brake units having brake plates which co-operate with a brake track when the brake units are actuated, the braking equipment comprising:
    one of the at least two brake units including a wear-compensating device which on release of said one brake unit after actuation sets a clearance between the brake plates of said one brake unit and the brake track in correspondence with a substantially constant value, wherein said wear-compensating device sets a desired fixed clearance between a fixed one of said brake plates and the brake track; and
    wherein said one brake unit includes a brake housing, a guide support, a movable brake plate movable with respect to said brake housing, and a positioning part connected to said brake housing by a slide connection and connected to said guide support by a slip connection, said brake housing being urged by a restoring unit in a direction of said fixed brake plate, wherein said restoring unit is arranged between said brake housing and said positioning part, between said positioning part and said guide support, or between said brake housing and said guide support and wherein a restoring force produced by said restoring unit is less than a slip resistance force produced in said slip connection, but said restoring force produced by said restoring unit is greater than a slide resistance force produced in said slide connection.

16. The elevator installation according to claim 15 wherein said movable and fixed brake plates are brought into contact with the brake track by an advance device during actuation, and when said one brake unit is open said wear-compensating device keeps a clearance from the brake track on a side of said fixed brake plate substantially constant and said advance device keeps a total clearance between said fixed and movable brake plates and the brake track constant.

17. The elevator installation according to claim 16 wherein said total clearance corresponds with twice an amount of the clearance between said fixed brake plate and the brake track.

18. The elevator installation according to claim 15 wherein the elevator installation includes a guide rail which has the guide track and the brake track formed thereon.

19. The elevator installation according to claim 15 wherein said wear-compensating device is arranged at a connecting point between said guide support and said brake housing, wherein said guide support is guided along the brake track substantially free of play by a guide shoe and said guide support is one of fixedly, resiliently and slidably connected with the elevator car.

20. The elevator installation according to claim 15 wherein said guide support includes a holder which accepts vertical braking forces generated in said brake plates and introduces the vertical braking forces into said guide support and into the car and substantially relieves said brake housing of the vertical forces.

21. The elevator installation according to claim 15 wherein each of said brake plates is connected with one of said brake housing and an advance device by a fastening plate, said fastening plates forming together with a holder a support point which introduces vertical braking forces from said brake plates into said holder, said brake housing being relieved of the vertical braking forces and enabling horizontal advance of said brake plates toward the brake track.

22. The elevator installation according to claim 15 wherein said one brake unit includes an advance regulating means for setting a predetermined total clearance between the brake plates and the brake track, and including an advance checking means detecting brake plate wear and departures from normal behavior of said one brake unit.

23. The elevator installation according to claim 15 wherein said movable brake plate is movable by an advance device regulated by an advance regulating means, said advance device moving said movable brake plate perpendicular to a facing surface of the brake track.

24. The elevator installation according to claim 23 wherein said advance device includes an electromechanical spindle drive having a spindle which in case of need can be actuated by a gear stage.

25. The elevator installation according to claim 15 wherein the braking equipment is arranged at the elevator car, the brake units are attached to the elevator car, and the brake units in case of need act on the guide tracks.

* * * * *